United States Patent [19]  [11] 4,397,781
Clark et al.  [45] Aug. 9, 1983

[54] AZO DYES FROM 2-AMINO-3-NITRO-5-ACYLTHIOPHENE

[75] Inventors: Gary T. Clark; Max A. Weaver, both of Kingsport, Tenn.

[73] Assignee: Eastman Kodak Company, Rochester, N.Y.

[21] Appl. No.: 276,543

[22] Filed: Jun. 22, 1981

[51] Int. Cl.³ .............................................. C09B 29/00
[52] U.S. Cl. ................................................... 260/152
[58] Field of Search ........................................ 260/152

[56] References Cited

U.S. PATENT DOCUMENTS 2,805,218  9/1957  Towne et al. .................. 260/152
2,825,726  3/1958  Towne et al. .................. 260/152
4,180,503  12/1979  vor der Brück et al. ........ 260/152
4,264,495  4/1981  Maher et al. .................... 260/152

Primary Examiner—Paul F. Shaver
Attorney, Agent, or Firm—Donald W. Spurrell; Daniel B. Reece, III

[57] ABSTRACT

Disclosed are novel azo dyes containing a substituted thiophene diazo moiety which produces bright blue shades on polyester and also have good affinity, dyeability and other properties on cellulose esters. The dyes have the formula

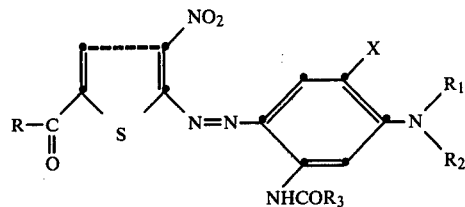

wherein R is selected from alkyl, phenyl and phenyl substituted with 1–3 of alkyl, alkoxy, halogen or nitro; $R_1$ and $R_2$ are each alkyl or one of which is also selected from hydrogen; $R_3$ is selected from hydrogen, cycloalkyl, alkyl, alkoxy, alkylamino, phenyl, phenyl substituted as for R above, and alkyl substituted with 1–3 of hydroxy, alkoxy, acyloxy, halogen, phenyl, phenoxy or cyclohexyl; X is hydrogen, alkyl, or alkoxy; and wherein each alkyl and alkoxy moiety is straight or branched and contains from 1–8 carbons.

7 Claims, No Drawings

AZO DYES FROM 2-AMINO-3-NITRO-5-ACYLTHIOPHENE

This invention relates to azo dyes from 2-amino-3-nitro-5-acylthiophene and aniline type couplers which produce bright blue shades on polyester and also have good affinity and dyeability on cellulose esters.

The present dyes have the general structure:

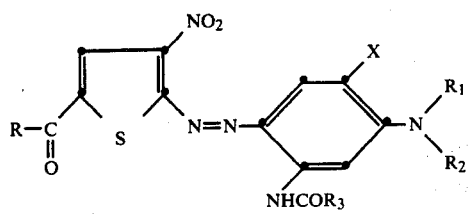

wherein R is selected from alkyl, phenyl and phenyl substituted with 1-3 of alkyl, alkoxy, halogen or nitro; $R_1$ and $R_2$ are each alkyl or one of which is also selected from hydrogen; $R_3$ is selected from hydrogen, cycloalkyl, alkyl, alkoxy, alkylamino, phenyl, phenyl substituted as for R above, and alkyl substituted with 1-3 of hydroxy, alkoxy, acyloxy, halogen, phenyl, phenoxy or cyclohexyl; X is hydrogen, alkyl, or alkoxy; and wherein each alkyl and alkoxy moiety is straight or branched and contains from 1-8 carbons.

The present dyes are generally superior to prior art dyes such as those of U.S. Pat. No. 2,805,218 in one or more properties such as fastness to light, oxides of nitrogen, wash, ozone, sublimation, perspiration and crock, and in dyeability properties including energy level, migration, leveling, pH stability, and build.

These dyes are prepared by diazotizing the 2-amino-3-nitro-5-acylthiophene, the preparation of which is given in detail in U.S. Pat. No. 2,805,218, and coupling with the aniline type coupler in known manner. The couplers are prepared by known procedures, some of which are given in U.S. Pat. No. 3,657,215.

Diazotization and Coupling

To concentrated sulfuric acid (25.0 ml) is added sodium nitrite (3.6 g) portionwise, allowing the temperature to rise. After cooling, 1:5 acid (1 part propionic acid:5 parts acetic acid) (50 ml) is added at below 15° C. After further cooling, 2-amino-5-acetyl-3-nitrothiophene (9.30 g, 0.05 m) is added, followed by an additional 50 ml of 1:5 acid, both added at 0°–5° C. The reaction mixture is stirred at 0°–5° C. for two hours. A 0.005 m portion of the diazonium salt solution is added to a chilled solution of 0.005 m of each of the following couplers (Examples 1-10) dissolved in 25 ml of 1:5 acid:

EXAMPLE 1
N,N-Diethyl-m-acetamidoaniline;

EXAMPLE 2
N,N-Di-n-propyl-m-acetamidoaniline;

EXAMPLE 3
N,N-Diethyl-m-benzamidoaniline;

EXAMPLE 4
N,N-Diethyl-m-isobutyramidoaniline;

EXAMPLE 5
N,N-Diethyl-m-cyclohexylcarbonylaminoaniline;

EXAMPLE 6
N,N-Di-n-butyl-m-phenoxyacetamidoaniline;

EXAMPLE 7
N-Ethyl-2-methyl-5-acetamidoaniline;

EXAMPLE 8
N-Butyl-2-methoxy-5-acetamidoaniline;

EXAMPLE 9
N,N-Di-n-hexyl-m-acetamidoaniline;

EXAMPLE 10
N,N-Diethyl-m-ethoxycarbonylaminoaniline.

Ammonium acetate was added to each of the above coupling mixtures with stirring until neutral to Congo Red test paper. After allowing to couple for one hour, the dyes were precipitated by adding water, collected by filtration, washed with water, and dried in air. The dyes in the following table were prepared by similar procedures.

TABLE I

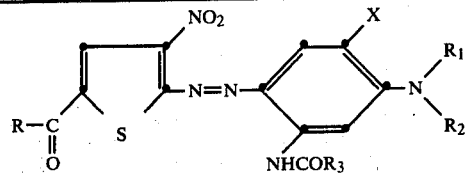

| Ex. No. | R | $R_1$ | $R_2$ | $R_3$ | X |
|---|---|---|---|---|---|
| 11 | $CH_3$ | $C_2H_5$ | $C_2H_5$ | $C_7H_{15}$—n | H |
| 12 | $CH_3$ | $C_2H_5$ | $C_2H_5$ | $CH_2OCH_3$ | H |
| 13 | $CH_3$ | $C_2H_5$ | $C_2H_5$ | $CH_2CN$ | H |
| 14 | $CH_3$ | $C_2H_5$ | $C_2H_5$ | $CH_2CH_2OH$ | H |
| 15 | $CH_3$ | $C_2H_5$ | $C_2H_5$ | $CH_2Cl$ | H |
| 16 | $CH_3$ | $C_2H_5$ | $C_2H_5$ | $CH_2C_6H_5$ | H |
| 17 | $CH_3$ | $C_2H_5$ | $C_2H_5$ | $NHC_2H_5$ | H |
| 18 | $CH_3$ | $C_2H_5$ | $C_2H_5$ | $CH(CH_3)_2$ | H |
| 19 | $CH_3$ | $C_2H_5$ | $C_2H_5$ | $C_7H_{15}$—n | $OCH_3$ |
| 20 | $CH_3$ | $CH(CH_3)C_2H_5$ | H | $CH_3$ | $CH_3$ |
| 21 | $CH_3$ | $C_2H_5$ | H | $CH_2CH_3$ | $OCH_3$ |
| 22 | $CH_3$ | $C_2H_5$ | $C_2H_5$ | $CH_3$ | $OC_2H_5$ |
| 23 | $CH_3CH_2$ | $C_2H_5$ | $C_2H_5$ | $CH_3$ | H |
| 24 | $(CH_3)_2CH$ | $C_3H_7$—n | $C_3H_7$—n | $CH_3$ | H |

TABLE I-continued

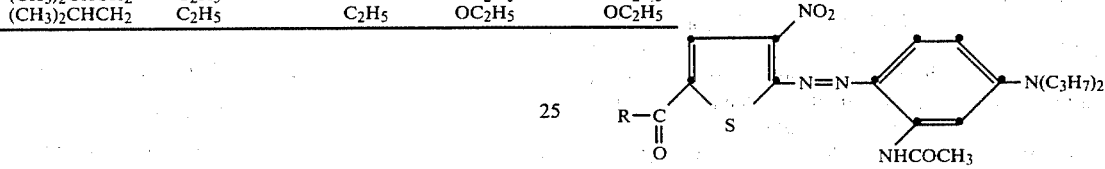

| Ex. No. | R | $R_1$ | $R_2$ | $R_3$ | X |
|---|---|---|---|---|---|
| 25 | $(CH_3)_2CH$ | $C_2H_5$ | $C_2H_5$ | $C_6H_5$ | H |
| 26 | $(CH_3)_2CH$ | $C_7H_{15}$—n | $C_7H_{15}$—n | H | H |
| 27 | $(CH_3)_2CH$ | $CH(CH_3)C_2H_5$ | H | $CH_3$ | H |
| 28 | $(CH_3)_2CH$ | $CH(CH_3)C_2H_5$ | H | $C_6H_4$—p-$OCH_3$ | H |
| 29 | $C_6H_5$ | $C_2H_5$ | $C_2H_5$ | $CH_3$ | H |
| 30 | p-Cl—$C_6H_4$ | $C_3H_7$—n | $C_3H_7$—n | $CH(CH_3)_2$ | H |
| 31 | p-$NO_2$—$C_6H_4$ | $C_3H_7$—n | $C_3H_7$—n | $CH(CH_3)_2$ | H |
| 32 | o-$CH_3$—$C_6H_4$ | $C_2H_5$ | H | $CH_3$ | $CH_3$ |
| 33 | p-$CH_3O$—$C_6H_4$ | $C_3H_7$—n | $C_3H_7$—n | $OC_2H_5$ | H |
| 34 | $C_6H_5$ | $C_2H_5$ | $C_2H_5$ | $CH_3$ | $OCH_3$ |
| 35 | n-$C_6H_{13}$ | $C_2H_5$ | $C_2H_5$ | $CH_3$ | H |
| 36 | $(CH_3)_2CHCH_2$ | $C_2H_5$ | H | $C_6H_5$ | $CH_3$ |
| 37 | $(CH_3)_2CHCH_2$ | $C_2H_5$ | H | $OC_2H_5$ | $OC_2H_5$ |
| 38 | $(CH_3)_2CHCH_2$ | $C_2H_5$ | $C_2H_5$ | $OC_2H_5$ | $OC_2H_5$ |

The invention has been described in detail with particular reference to preferred embodiments thereof, but it will be understood that variations and modifications can be effected within the spirit and scope of the invention.

We claim:

1. A dye of the formula

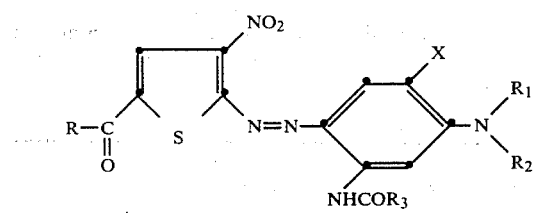

wherein R is selected from alkyl, phenyl and phenyl substituted with 1-3 of alkyl, alkoxy, halogen or nitro; $R_1$ and $R_2$ are ach alkyl or one of which is also selected from hydrogen; $R_3$ is selected from hydrogen, cycloalkyl, alkyl, alkoxy, alkylamino, phenyl, phenyl substituted as for R above, and alkyl substituted with 1-3 of hydroxy, alkoxy, acyloxy, halogen, phenyl, phenoxy, or cyclohexyl; and X is hydrogen, alkyl, or alkoxy.

2. The dye according to claim 1 having the formula

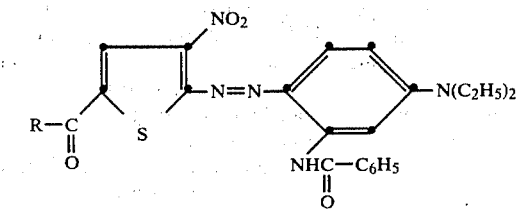

3. The dye according to claim 1 having the formula

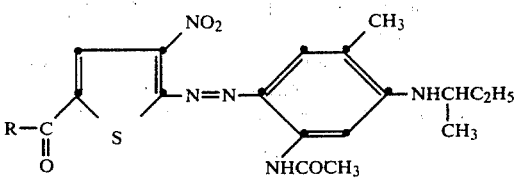

4. The dye according to claim 1 having the formula

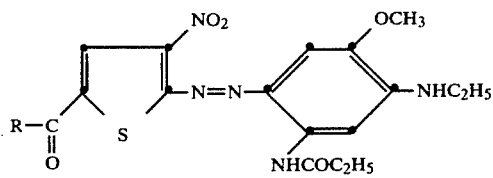

5. The dye according to claim 1 having the formula

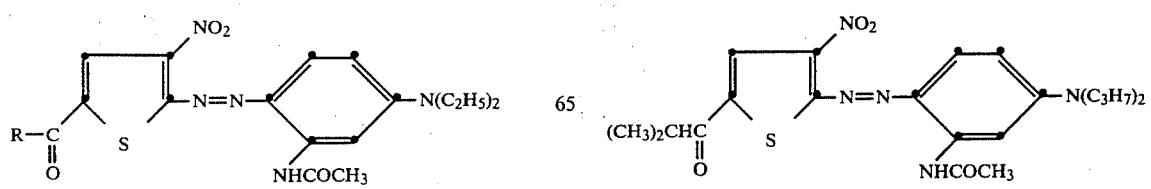

6. The dye according to claim 1 having the formula

7. The dye according to claim 1 having the formula

* * * * *